United States Patent [19]
Knifton et al.

[11] 3,832,401
[45] Aug. 27, 1974

[54] HOMOGENEOUS CATALYSTS USEFUL IN THE REDUCTION OF NITROAROMATICS TO AMINES

[75] Inventors: John F. Knifton, Poughquag; Robert M. Suggitt, Wappingers Falls, both of N.Y.

[73] Assignee: Texaco Inc., New York, N.Y.

[22] Filed: Mar. 4, 1971

[21] Appl. No.: 121,132

[52] U.S. Cl......... 260/570.8 R, 260/570.9, 260/571, 260/573, 260/574, 260/575, 260/576, 260/577, 260/578, 260/580, 260/689
[51] Int. Cl............................................. C07c 85/10
[58] Field of Search.......... 260/570.8 R, 570.9, 571, 260/573, 574, 575, 576, 577, 578, 580, 689

[56] References Cited
UNITED STATES PATENTS

| | | |
|---|---|---|
| 2,867,628 | 1/1959 | Cass................................ 260/580 X |
| 3,110,747 | 11/1963 | Mullineaux.................. 260/570.9 X |
| 3,194,839 | 7/1965 | Robinson et al................ 260/578 X |
| 3,253,039 | 5/1966 | Rylander et al. ............... 260/571 X |
| 3,454,644 | 7/1969 | Dewhirst.......................... 260/570.9 |
| 3,489,786 | 1/1970 | Dewhirst.......................... 260/465.1 |
| 3,637,820 | 1/1972 | Dodman et al. ................ 260/575 X |

OTHER PUBLICATIONS

Groggins, Unit Processes in Organic Synthesis, McGraw–Hill Book Co., Inc: New York, 1958, 175–179.
Noller, Chemistry of Organic Compounds, W. B. Saunders Co.: Philadelphia, 1951, page 445.

Primary Examiner—Lorraine A. Weinberger
Assistant Examiner—C. F. Warren
Attorney, Agent, or Firm—T. H. Whaley; C. G. Ries

[57] ABSTRACT

This invention concerns the use of homogeneous ruthenium and iron catalyst complexes preferably stabilized by a displaceable ligand such as triphenyl phosphine, and/or solubilized by a solvating agent such as the lower alkanols, said catalyst complexes being utilized as reducing agents in the presence of a non-aqueous, non-oxidizing reaction medium, at reaction temperatures of from about 35° to 160° C and under superatmospheric pressures of at least 100 psig, in a substantially hydrogen atmosphere, to selectively reduce at least one nitro group of nitroaromatics to the corresponding aromatic amine.

1 Claim, No Drawings

HOMOGENEOUS CATALYSTS USEFUL IN THE REDUCTION OF NITROAROMATICS TO AMINES

BACKGROUND OF THE INVENTION

This invention concerns the use of homogeneous catalysts to reduce nitroaromatic substrates to their corresponding amines. More particularly, this invention concerns the use of homogeneous metal complexes as reducing agents for nitroaromatic substrates with greater selectivity and yield under a variety of solvent conditions than can be obtained with heterogeneous catalysts of the prior art.

Until comparatively recently homogeneous metal catalysts have mainly been used in the conversion of unsaturated organic molecules, particularly those with olefinic and acetylenic bonds, to their hydrogenated-/oxygenated and/or isomerized derivatives. Particularly favored were linear olefins both of the alpha and internal type. Homogeneous catalysts have become especially popular in these reactions because they generally offer several practical advantages over comparable heretogeneous catalysts. Typical heterogeneous catalysts comprise an inert microporous support such as alumina, carbon, magnesia, chromia, silica and their mixtures, having microporous structure and a very large internal surface area which can, in some instances, approach areas of 1,000 square meters per gram or even higher. Ordinarily these catalytic supports contain, or have deposited upon them, finely divided and activated metals or metalloids. These include platinum, palladium, nickel, rhenium, rhodium and the like. The very nature of their physical structure causes these heterogeneous catalysts to form distinct and separate phases in the reaction mixture which, it can be theorized, minimize contacts between the substrate to be converted and the catalytic entity. Further, because the activity of these catalysts is believed to be intimately related to their large surface area, many of these types of heterogeneous catalysts are readily deactivated or poisoned by a variety of materials known as catalyst poisons. This, in turn, requires fairly frequent replenishment, or where economically feasible, low cost processes of regeneration. Other disadvantages generically associated with heterogeneous catalysts are that they usually require more extreme conditions of temperature and pressure, and to some extent exhibit relatively poor selectivity.

By selectivity, as defined herein, is meant the efficiency in catalysing a desired conversion relative to other undesired reactions. In this instance reduction of nitro ($NO_2$) groups on aromatic rings to the desired and corresponding amines. Selectivity is usually expressed as a factor representing the amount of the amine formed, divided by the amount of starting nitroaromatic converted. Amine yield here refers to the fraction representing the amount of amine formed, divided by the amount of nitroaromatic charged. Inasmuch as low selectivity, catalyst poisoning, as well as lower yields, are undesirable problems more commonly associated with heterogeneous than homogeneous catalysts, there has been an increasing tendency to turn to the latter type catalysis.

For example, homogeneous catalyst complexes have been increasingly favored in order to obviate some of the problems attributed to heterogeneous catalysts, such as multiple phase formation, poisoning and mediocre selectivity, which have inherently been associated with hereterogeneous catalysis.

However, much of the reported homogeneous catalysis work has been directed toward the conversion of unsaturated organic molecules especially those with olefinic and/or acetylenic bonds to their hydrogenated, oxygenated, and/or isomerized derivatives. While homogeneous catalysts have been shown to be especially useful in the reduction of olefins, both of the internal and alpha type, there has been little known work using homogeneous catalysts in the reduction of functional groups other than carbon-to-carbon bonds.

Recently, a novel process has been developed which under certain reaction parameters has enabled homogeneous catalytic techniques to be extended to the reduction of nitroparaffins to their corresponding paraffinic amine. Not only are selectivities and yields good, but the resultant paraffinic amines can be recovered from the reaction mixtures by standard procedures normally used in amine isolation and purification. These include acid extraction followed by treatment of the amine salt product with alkali to provide the free amine.

However, the above process is applicable only to the reduction of nitroparaffin substrates and is not useful in the hydrogenation of nitroaromatics to aromatic amines nor to the hydrogenation of unsaturated nitrogen containing groups.

SUMMARY OF PRIOR ART

Recently Calderazzo et al[*] and S. Murahashi and S. Horje[**] have reported the reduction of nitrobenzene to

[*] Calderazzo et al Reported in Inorg. Chem. 9, 342(1970)
[**] Murahashi et al Bull. Chem. Soc. Japan, 33,78(1960) aniline using carbonyl catalysts (solubized carbonyls in the former and octacarbonyl cobalt in the latter). In both instances, hydroformylation conditions (CO and $H_2$ mixtures) are required, and selectivities to the desired primary amines are only mediocre, ranging from about 40 to 70 percent, and these products are contaminated with a variety of unwanted reduction products. Further, both references disclose stringent reaction conditions of temperature and pressure. For example, Calderazzo requires temperatures of 160°C. under 200 atmospheres of pressure contributed by CO and $H_2$ to hydrogenate nitrobenzene to aniline. A recent review of homogeneous catalysis for hydrogenation reactions* appears to document the paucity of reported reductions of nitroaromatics. * Lyons et al Ind. Eng. Chem. Prod. Res. Develop., Vol. 9, No. 1, March 1970

In contrast, applicants have discovered a hydrogenation process using homogeneous metal complexes, particularly those of ruthenium and iron which have hydrogenated nitroaromatics at room temperature with hydrogen pressures below 20 atmospheres, at especially high substrate to catalyst molar ratios (exceeding 200) and whose selectivity to amine generally ranges from about 85 to 100 percent.

In view of the aforementioned deficiencies of heterogeneous and homogeneous catalysts in the hydrogenation of nitroaromatics, the catalysts of this invention represent a substantial advance in the art and satisfy in most instances the following objects:

It is an object of this invention to provide novel homogeneous transition metal complexes especially those selected from the complexes of iron, ruthenium and mixtures thereof, which offer the following more specific advantages;

a. the ability to hydrogenate nitroaromatics even in the presence of other highly reactive functional groups such as halogen, alkoxy and acetyl, b. the ability to selectively hydrogenate specific structural isomers of a particular nitroaromatic to a desired amine aromatic, for instance, the selective hydrogenation of particular nitroxylene isomers to their amine derivatives, the xylidines, c. the ability to selectively hydrogenate bi- and polynitroaromatics to particular nitroaromatic amine intermediates, d. the ability to function under a variety of solvent environments including polar, aromatic, alkali and acid media.

Other objects will become apparent to those skilled in the art after a perusal of this application.

In practice, the above objects, among others, will be achieved by the following procedure or minor modifications thereof:

In the broadest contemplated practice, a. a molar excess of nitroaromatic to be reduced is admixed in the absence of oxidizing conditions, with at least one transition-metal catalyst complex in a substantially non-aqueous, inert solvent media, sufficient to solubilize said substrate and catalyst to form a reaction media, b. the said reaction media is heated from at least 20°C. and upwards under superatmospheric pressures in the presence of at least a stoichiometric quantity of hydrogen (with respect to nitroaromatic substrate) until substantial reduction of the nitroaromatic to the corresponding amine takes place, and c. the amine contained therein is separated.

In the favored practice a substantially anhydrous, deoxygenated, substantially nonaqueous reaction mixture comprising the nitroaromatic substrate is formed by:

a. admixing at least a 5 molar portion* of a mononuclear nitroaromatic with one molar portion of at least one transition metal catalyst complex selected from the group consisting of ruthenium, iron and mixtures thereof, in the presence of sufficient inert solvent media to solubilize said substrate and catalyst, said solvent media being selected from the group consisting of essentially neutral media, alkaline and acidic media, said reaction mixture being substantially free of oxidizing agents,

*These 5 molar figures represent proportions or ratios of the substrate to the catalyst rather than absolute numbers b. heating said reaction mixture while free from oxidizing agents between about 20° and 160°C. under initial superatmospheric pressures ranging from about 100 psig and upwards, said pressure being supplied by at least a stoichiometric excess of gaseous hydrogen (with respect to nitroaromatic substrate in the mixture), said heating taking place in a substantially anhydrous environment, for at least a time sufficient to substantially reduce said nitroaromatic substrate to its corresponding amine, and c. isolating said amine contained therein.

In order to aid in the full understanding of the inventive concept, the following additional disclosure is submitted:

A. NITROAROMATIC SUBSTRATES — Any aromatic substrate containing from six to 30 carbon atoms, or more, and containing at least one nitro ($NO_2$) group per molecule may be employed. These include the mononuclear mononitroaromatics such as nitrobenzene, nitrotoluenes, nitroxylenes as well as the dinuclear, trinuclear and higher (polynuclear) mono nitroaromatics such as 1-nitronaphthalene and 5-nitroanthracene. The di- and trinitro aromatics, that is di-, trinitromononuclear compounds such m-dinitrobenzene and its congeners may also be substrates, in addition to di-, tri and poly-nitropolynuclear aromatics such as 1,8-dinitronaphthalene and its homologues and, where they are available, nitro steroids. The nitro group need not be directly bonded to the aromatic ring but can include derivatives such as nitrobenzyl, wherein the nitro group is attached to an alkylene group and separated from an aromatic nucleus by groups containing one to three carbon atoms. Inasmuch as the starting materials are more readily available at lower costs, the favored nitro-aromatic substrates are those wherein from 1 to 3 nitrogroups are bonded to mono, bi- or trinuclear (benzene) ring system containing from 0 to 3 alkyl groups per ring. The nitrated aromatics can be derived from any number of different nitration procedures, such as vapor-liquid phase nitration, liquid-liquid procedures, etc. Where selectivity to a particular aromatic amine is not desired, mixtures of isomers or mixtures of mono, di- and trinuclear substrates containing 1 to 3 nitro groups can be used. The substrate can be in the form of nitrate aromatics containing substantial quantities of non-nitrated aromatics or their mixtures, neat or containing other inert solvents or diluents, such as paraffins, ethers, and the like. Substrates such as nitrobenzene and its alkylated homologues are especially useful since they are readily available at relatively low cost and they lend themselves to substantially complete conversions to specific and desired aromatic amines within relatively short reaction times. Further, these reduced products can generally be separated from contaminants using standard purification and/or isolation techniques.

B. INERT DILUENT AND SOLVENTS — The novel reduction process can be run most readily in the presence of sufficient inert diluent to form a homogeneous singlephase reaction mixture. Since a homogeneous, or uniform, reaction mixture offers the most convenient vehicle in which to rapidly reduce the nitroaromatics to amines in good yield, the use of inert solvent is employed. Generally speaking, any organic liquid in which the nitroaromatic substrate and catalyst is soluble and which is inert to reduction under the conditions of the inventive process, can be used as a diluent. These include the alkyl ethers, such as diethyl ether, the $C_1$ to $C_6$ alkanols, the hydroxylated ethers, chlorinated hydrocarbons such as methylene chloride, aromatics such as benzene, toluene and xylene, as well as their mixtures with or without alkaline or acid agents. The choice of whether to use an acidic, alkaline or neutral polar solvent system depends primarily upon the nitroaromatic to be reduced. For example, $RuCl_2(P(C_6H_5)_3)_3$ lends itself to the rapid near quantitative reduction of nitrobenzene to aniline in an alkaline benzene-ethanol solution. Similarly the same catalyst in an essentially neutral 1:1 benzene-ethanol system is useful in selectively reducing 4-nitro-o-xylene in the presence of an equal quantity of its isomer 2-nitro-m-xylene. In a similar fashion the reduction of nitrobenzene to aniline can be run in a neutral polar aromatic media (benzene) or in a non-aqueous system of acetic acid - benzene and ethanol.

C. REDUCING ATMOSPHERE — Insofar as can be determined, the homogeneous catalyst, possibly in some intermediate, more active form, abstracts hydrogen from the environmental, hydrogen atmosphere. While nitrogen, methane, ethane, or inert gases such as helium, argon or neon may be present in small proportions, (less than 30 percent by volume) without adversely effecting conversions or yields, their presence appears to offer no concurrent advantages and, therefore, is to be avoided.

Ordinarily, a reaction vessel capable of being pressurized, agitated, heated and cooled is charged with all of the components of the reaction mixture, nitroaromatic, catalyst system, solvents, etc. These components either individually or collectively are flushed with inert gas such as argon or nitrogen because of their known sensitivity to oxidizing agents such as air. The residual flushing or purging of inert gaseous environment is conveniently accomplished with hydrogen or nitrogen and the reaction mixture is pressurized initially to the desired extent and heated in a substantially hydrogen atmosphere until the desired reduction to aromatic amine takes place.

D. REDUCTION TEMPERATURE — The reaction temperature for reduction is in many ways quite flexible. At temperature below about 20°C., however, the rate of reduction of substrate to the amine is quite slow, while at temperatures much above 160°C. yields fall off sharply, probably due to catalyst decomposition, and for this reason these temperatures in excess of 160°C. are to be avoided. Since good results have been obtained between 35°C. and 160°C. these are favored. Inasmuch as the best yields of amine have been obtained at reduction temperatures between about 50°C. and 135°C. at superatmospheric pressures, when the preferred homogeneous ruthenium or iron complexes are used as catalysts, these temperatures represent the preferred temperature range.

E. REDUCTION PRESSURES — Pressures of hydrogen greater than atmospheric (O psig) are required to obtain reasonable rates of reduction at reaction temperatures above 35°C. Superatmospheric hydrogen pressures ranging from about 100 psig to about 2,000 psig, coupled with temperatures of about 35°C. to 135°C. consistently give the best yields within reasonable reaction times and for this reason are preferred.

F. REACTION TIMES FOR SUBSTANTIAL REDUCTION — The time required for substantial reduction of the nitroaromatics to the corresponding amines is a variable, dependent primarily upon the temperature and pressure employed, the particular nitroaromatic substrate to be reduced and the ratio of substrate to catalyst system employed, among other factors. Ordinarily the reaction times will vary between about 10 minutes to 24 hours. In most instances, times ranging from at least about 1 hour to about 8 hours under the preferred conditions of temperature and pressure are required for substantial reduction and these reaction times represent the preferred range of reaction times.

G. CATALYST SYSTEM — The homogeneous catalysts of this invention are selected from the metals of Group VIII of the Periodic Table* and mixtures thereof. These metals may be employed in the form of their ionic solutions or complexes in varying oxidation states, usually between −2 to +8 by well known and well documented references in the technical literature.

*Derived from "Advanced Inorganic Chemistry," by F.A. Cotton and G. Wilkinson, 2nd Ed.

While all of the above metals are utilizable under the appropriate combination of reaction conditions to reduce nitroaromatics to their corresponding amines, as is usually the case in any large group or class, one or more members of the subgroup or subclass, for one reason or another, are favored, compared to the class as a whole. In the instant case, the favored metal catalysts are those metals included within Group VIII of the Periodic Table*, selected from iron and ruthenium and/or mixtures of these metals.

*Derived from "Advanced Inorganic Chemistry," by F. A. Cotton and G. Wilkinson, 2nd Ed.

While the above more restricted grouping of metals are also useful as catalysts in an acidic media to reduce nitroaromatics to their amines, in most instances neutral solvent or basic solvent environments are favored dependent upon the nitroaromatics to be reduced. For example, for the selective hydrogenation of certain nitroxylene isomers neutral media give the best results, and a neutral solvent system such as 1:1 mixture of benzene to ethanol, gives a high degree of selectivity, and good and reproducible yields of the desired amine product, under relatively mild reduction conditions, within a reasonably short reaction time and hence is preferred for this purpose. Whereas for many other reductions of nitroaromatics, an alkaline solution of both these solvents is preferred.

In order to disclose the workings of the invention, particularly as to the composition of the metal catalyst, and when it is employed, the discussion will be limited to ruthenium whose behavior as a homogeneous catalyst is believed to be typical of the other highly active catalytic entities such as iron.

Insofar as is known, any ruthenium compound or complex may be employed provided that two conditions are satisfied:

1. that the catalytic entity is stable under the reaction conditions employed and it exercises the desired reductive activity, and 2. that the ruthenium catalyst is soluble and does not precipitate prior to the substantial reduction of the nitroaromatic.

Preferably, but not necessarily, the metallic compound as typified by ruthenium is one which contains displaceable ligands. However, in some instances it is desirable to use a solvating agent to convert the ruthenium compound to a more soluble form. The solvating agent usually comprises a polar solvent having an active hydrogen atom preferably contained in a hydroxyl group. Suitable solvating agents include the lower alkanols such as ethanol and propanol, cycloaliphatic or aromatic alcohols and phenols, as well as the mixtures of these alkanols and aromatics either in the neutral or alkaline state.

It is not essential that all of the ruthenium compound shall be in solution at the beginning of the reduction provided that at least a catalytic amount is present. A catalytic amount as defined herein refers to an amount sufficient under the appropriate combination of temperature and pressure parameters to initiate the desired reduction. In the instance of ruthenium, if at least 0.0001 moles, preferably at least 0.001, of ruthenium per mole of nitroaromatic are present, catalysis will take place. Higher ratios of catalyst to substrate give more rapid conversions although ratios of 0:1 or more are disadvantageous in that they are costly and entrap or entrain product, unnecessarily complicating isolation and purification. Preferably the ruthenium compound is used in the form of a complex containing one or more neutral π-bonding ligands such as carbonyl (CO), substituted carbonyl, or nitrosyl, alone or coupled with a ligand containing a donor atom of Group IVB, Group VB or Group VIB such as triphenylphosphine. These ligands may or may not be displaced during hydrogenation. While no mechanism is postulated or is relied upon for patentability, it is believed that the catalysts as typified by ruthenium, form stable hydride species which are soluble in the liquid reaction medium used. As disclosed above, the neutral ligand is preferably an organic substituted phosphine or arsine such as $PR_3$, $ASR_3$, where P and As represent their respective elements and R is a symbol for hydrocarbyl radical, particularly phenyl or alkylated phenyl. One or more of the radicals may be the same or different at any different time. Suitable anionic ligands include Cl—, Br—, CN—, NCO, $CH_3COO$—, with the halogens being preferred.

Illustrative ruthenium complexes which function effectively as reducing agents in the basic reaction media include $RuHCl(PPh_3)_3$, $RuCl_3(PPh)_3(solvent)$, $RuCl_3[S(C_2H_5)_2]_3^*$, $RuCl_2(PPh_3)_3^*$, $RuCl(NO)(PPh_3)_2$, $RuCl_2(CO)_2(PPh_3)_2$, \* Where Ph is a symbol for the phenyl radical $C_6H_5$. $RuCl_2[As(C_2H_5)_3]_3$, $RuBr_2(PPh_3)_3$, $Ru(CO)_3(PPh_3)_2$, $RuCl_2[As(PPh_3)_3]$, $Ru(Acet)_3$. \*

Illustrative iron complexes which function effectively include iron pentacarbonyl ($Fe(CO)_5$) as well as $Fe(CO)_3(PPh_3)_2$, $Fe(Co)_3(AsPh_3)_2$, $[Fe(CO)_4][Fe(en)_3]^{**}$, $Fe(Naph)_3$, \*\*\* and $Fe(Acet)_3$.

\* Where Acet is a symbol for the acetylacetonate group ($CH_3COCHC.CH_3$) \*\* Where en is a symbol for ethylenediamine \*\*\* Where naph is a symbol for the naphthenate group ($C_{10}H_7CO_2$)⁻

The alkaline media required for some of the homogeneous metal complexes to function as reducing agents for nitroaromatic reductions include, among others, the alkali metal hydroxides, methoxides, carbonates, etc., as well as nitrogeneous bases. More specifically they include KOH, NaOH as well as triethylamine, diethanolamine, pyridine, triethylenetetramine, n-hexylamine, 1,3-diaminopropane, etc. As indicated earlier, for some reductions acidified mixtures of non-aqueous solvents are also satisfactory.

The mole ratio of nitroaromatic substances (as typified by mixtures of nitrobenzene isomers) to homogeneous catalyst (as typified by ruthenium complexes) should not exceed about 1000:1, especially to achieve optimum yields, within a reasonable period of time without having reproducibility problems. As previously disclosed ranges of substrate to catalyst lower than about 10:1 are to be avoided in order to obviate isolation and purification. For the best balance of yield to reaction time, ratios varying from about 50:1 to 200:1 of substrate to catalyst should be employed.

H. EXPERIMENTAL PROCEDURE - The reductive process is ordinarily performed as follows:

A conveniently sized reactor fitted with gas inlet, condenser, stirring, heating and pressurizing means, is charged with catalyst solution, preferably deoxygenating during charging, and containing the nitroaromatic substrate and inert solvent. Deoxygenation can be accomplished by a hydrogen or nitrogen flush of the reaction mixture. The agitated reaction mixture is sealed and heated to above 20°c. under superatmospheric pressure provided by hydrogen under pressure.

Work-up of the product mixture is as follows: After hydrogen absorption has substantially ceased, indicating completion of the reduction, the pressurized reactor is cooled and excess gas bled off. The reaction mixture containing amine product, catalyst and volatiles have the volatiles evaporated off under reduced pressure and the spent catalyst is filtered or removed by centrifugation. The reaction mixture contained in the filtrate is then recovered by one or more of the methods used to separate amines from contaminants. For example, the amine can be steam distilled or extracted with mineral acid. In the latter case, the amine salt is converted (sprung) to the free amine by neutralization with a basic material.

In any event, the amine product can be further purified or used as obtained, dependent upon product application. In general, the amines are identified by gas chromatography (gc), infrared spectra (ir) and/or nuclear magnetic resonance (nmr) spectra.

Having described the inventive process in general terms, the following examples are submitted to supply specific illustrative embodiments. Unless otherwise specified, all temperatures are in centigrade and all parts are by weight rather than volume.

EXAMPLES 1 TO 12

HYDROGENATION OF NITROBENZENE IN BASIC MEDIA USING $RuCl_2[P(C_6H_5)_3]_3$ AS THE CATALYST COMPLEX

Suitable autoclave-type reactors provided with pressurizing, heating, cooling, agitating and distillation means are charged with designated molar ratios of nitrobenzene substrate to tris(triphenylphosphine)ruthenium(II) chloride, in 80 ml of a deoxygenated 1:1 equi-volume of benzene and ethanol solution containing 0.56 g. of KOH. The deoxogenated reaction mixture is sealed, pressurized to the designated initial hydrogen pressure (except for Example 12), which is run at atmospheric pressure), and then heated for the designated time at the indicated temperature.

Upon cooling and bleeding off excess gas, the aniline product is recovered from the reactor, and the solvent system removed by evaporation under reduced pressure. The precipitated ruthenium catalyst is filtered off and recovered as a brown solid which is washed off with a fraction of petroleum ether and air-dried. Conversions and yields are calculated upon the basis of gc and ir analysis. The data which appears in Table I show that the good nitrobenzene conversions and yields of aniline product are obtained over a wide range of substrate/catalyst ratios but because of the reduced volumes involved at low ratios, entrainment of aniline product complicates isolation under these conditions. The data also confirms that nitrobenzene reduction is observed at temperatures of 25°C. or higher, and hydrogen pressures of at least 100 psig. The best results are consistently obtained at pressures from 500 psig and upward coupled with temperatures ranging from 50°C. to 135°C.

EXAMPLES 13 TO 25

HYDROGENATION OF NITROBENZENE IN NEUTRAL MEDIA USING $RuCl_2[P(C_6H_5)_3]_3$ AS CATALYST.

Suitable autoclave-cype reactors provided with pressurizing, heating, cooling, agitating and distillation means are charged until the designated molar ratios of nitrobenzene substrate to tris(triphenylphosphine) ruthenium(II) chloride in a deoxygenated 1:1 equi-volume of benzene and ethanol solution. The deoxygenated reaction mixture is sealed and then either pressurized to the designated initial hydrogen pressure, and heated for the designated time at the indicated temperature, or raised to temperature under a small pressure of nitrogen (50–100 psig) and then pressurized with hydrogen. Upon cooling, the aniline product and catalyst are recovered as described in Example 1.

The data in Table II serve to show that good nitrobenzene conversion and aniline selectivities may be achieved with the RuCl(PPh$_3$)$_3$ catalyst in neutral media over a wide range of reaction temperature, pressure and substrate/catalyst ratios.

rivatives containing one or more linear or cyclic alkyl groups are reduced using a 200:1 molar ratio of substrate to catalyst heated to 135°C. under 1,200 psig of hydrogen, in a neutral equimolar mixture of solvents. The reaction time (in minutes), percent conversion and yields are given in Table III. In all instances gc and ir are used to monitor the reaction and are the basis of

TABLE I

HYDROGENATION OF NITROBENZENE IN BASIC MEDIA

| EXAMPLE NO. | MOLAR RATIO SUBSTRATE:-CATALYST | INITIAL REACTION CONDITIONS TEMPERATURE | PRESSURE PSIG | TIME MINUTES | % CONVERSIONS | % ANILINE (SELECTIVITY) |
|---|---|---|---|---|---|---|
| 1 | 5:1 | 100°C. | 1300 | 10 | 100 | 100 * |
| 2 | 40:1 | 120°C. | 1300 | 15 | 100 | 99 |
| 3 | 100:1 | 135°C. | 1300 | 30 | 100 | >95 |
| 4 | 200:1 | 130°C. | 1300 | 45 | 100 | 92 |
| 5 | 200:1 | 135°C. | 2000 | 45 | 100 | >90 |
| 6 | 200:1 | 135°C. | 100 | 400 | 100 | 93 |
| 7 | 200:1 | 75°C. | 1300 | 400 | 100 | >90 |
| 8 | 200:1 | 50°C. | 1300 | 500 | 100 | >90 |
| 9 | 200:1 | 125°C. | 500 | 145 | 100 | 100 |
| 10 | 50:1 | 25°C. | 1200 | 570 | 100 | 100 |
| 11 | 50:1 | 25°C. | 300 | 600 | 37 | 78 |
| 12 | 50:1 | 24°C. | ATM** | 500 | >20 | *** |

* Because of relatively large proportion of solid spent catalyst isolation, conversation and selectivity are difficult to determine
** Atmospheric pressure
*** Not determined

TABLE II

HYDROGENATION OF NITROBENZENE IN NEUTRAL MEDIA

| EXAMPLE NO. | MOLAR RATIO SUBSTRATE/-CATALYST | INITIAL REACTION CONDITIONS TEMPERATURE (°C.) | H$_2$PRESSURE (PSIG) | TIME MINUTES | NITROBENZENE CONVERSION(%) | ANILINE SELECTIVITY(%) |
|---|---|---|---|---|---|---|
| 13 | 5 | 120 | 1200 | 50 | 100 | 95 |
| 14 | 50 | 120 | 1200 | 100 | 100 | 95 |
| 15 | 100 | 105 | 1180 | 50 | 30 | >90 |
| 16 | 200 | 105 | 1180 | 60 | 20 | >90 |
| 17 | 500 | 105 | 1180 | 40 | 10 | >90 |
| 18 | 1000 | 105 | 1180 | 40 | 5 | >90 |
| 19 | 200 | 90 | 1180 | 90 | 15 | >90 |
| 20 | 200 | 125 | 1180 | 220 | 100 | 82 |
| 21 | 200 | 135 | 1200 | 240 | 100 | 92 |
| 22 | 200 | 160 | 1200 | 200 | 100 | 80 |
| 23 | 200 | 105 | 800 | 70 | 15 | >90 |
| 24 | 200 | 105 | 400 | 90 | 18 | >90 |
| 25 | 200 | 105 | 100 | 90 | 5 | >90 |

EXAMPLES 26 TO 34

HYDROGENATION OF ALKYLATED NITROBENZENE DERIVATIVES USING A HOMOGENEOUS RUTHENIUM CATALYST COMPLEX IN NEUTRAL MEDIA

Using the apparatus, reduction procedure and catalyst described in Example 13, various nitrobenzene deconversions and yields. The major products in all cases are alkyl substituted anilines. These products were isolated by the procedure described in Example 1, and were identified by gc, ir, and elemental analyses, and by comparison with other authentic samples.

TABLE III

HYDROGENATION OF VARIOUS ALKYLATED NITROBENZENE DERIVATIVES IN NEUTRAL MEDIA

| EXAMPLE NO. | SUBSTRATE | REACTION TIME (MINUTES) | CONVERSION (%) | SELECTIVITY TO AMINE (%) |
|---|---|---|---|---|
| 26 | O-Nitrotoluene | 200 | 100 | 90 |
| 27 | p-Nitrotoluene | 200 | 100 | 90 |
| 28 | 2,6-Dimethyl-1-Nitrobenzene | 70 | 100 | 95 |
| 29 | 2,5-Dimethyl-1-Nitrobenzene | 220 | 100 | 91 |
| 30 | 2,4-Dimethyl-1-Nitrobenzene | 220 | 100 | 85 |
| 31 | 3,5-Dimethyl-1-Nitrobenzene | 260 | 100 | 76 |
| 32 | 3,4-Dimethyl-1-Nitrobenzene | 950 | 100 | 90 |
| 33 | 2-Nitromesitylene | 90 | 100 | 94 |
| 34 | 1-Nitro-4-Cyclohexylbenzene | 210 | 100 | 85 |

EXAMPLES 35 TO 41

SELECTIVE HYDROGENATION OF VARIOUS NITROBENZENE DERIVATIVES IN THE PRESENCE OF OTHER FUNCTIONAL GROUPS

Using the apparatus, reduction procedure, and catalyst described in Example 13, various nitrobenzene derivatives containing other functional groups are reduced in a neutral equimolar, benzene-ethanol solvent mixture, at 105°–135°C. under 1,200 psig of hydrogen using a 200:1 molar ratio of substrate to ruthenium catalyst. The reaction time (in minutes), percent conversion and selectivity to the major amine products are given in Table IV. In all instances gc and ir are used to monitor the reaction and are the basis of the conversion and selectivity data. The major products of reduction were isolated by the procedure described in Example 1, and were identified by gc, ir and elemental analyses, and by comparison with authentic samples.

It can be seen from the results in Table IV that the nitro group in nitroaromatic derivatives may be reduced to amine in the presence of a number of other functional groups including the halogen, hydroxy, methoxy (OCH$_3$), acetyl (COCH$_3$) and olefinic linkages.

tem employed. Table V shows that with this technique, nitroaromatics may be hydrogenated to amine in such different solvents as aromatics (benzene), aromatic-alcohol mixture, acidic media (e.g., added acetic acid) and chlorinated hydrocarbons (methylene chloride).

EXAMPLE 46

SELECTIVE HYDROGENATION OF NITROXYLENE ISOMERIC MIXTURES USING A RUTHENIUM HOMOGENEOUS CATALYST

Utilizing the apparatus, techniques and RuCl$_2$[P(C$_6$H$_5$)$_3$]$_3$ as the catalyst complex of Example 13, 4-nitro-o-xylene is preferentially hydrogenated to the substantial exclusion of its 2-nitro-m-xylene isomer.

The charge comprises an equimolar mixture of 4-nitro-o-xylene and 2-nitro-m-xylene (1.2 ml (12.5 mmoles) of each component), an 80 ml portion of an equimolar mixture of benzene and ethanol and 0.48 g. (0.50 mmoles) of RuCl$_2$[P(C$_6$H$_5$)$_3$]$_3$ catalyst. That is, the molar ratio of the total nitroxylenes to catalyst is 50:1. After deoxygenating the solvent mixture and dissolving the catalyst and nitroxylenes solution, this solution is sealed under an initial nitrogen pressure of 50

TABLE IV

THE SELECTIVE HYDROGENATION OF VARIOUS NITROBENZENE DERIVATIVES IN THE PRESENCE OF OTHER FUNCTIONAL GROUPS

| EXAMPLE NO. | SUBSTRATE | REACTION TIME (MIN.) | CONVERSION (%) | MAJOR PRODUCT | SELECTIVITY TO AMINE (%) |
|---|---|---|---|---|---|
| 35 | 4-NITROANILINE | 330 | 100 | P-PHENYLENEDIAMINE | 94 |
| 36 | 4-NITROCHLOROBENZENE | 435 | 100 | 4-CHLOROANILINE | 86 |
| 37 | 4-NITROANISOLE | 240 | 100 | P-ANISIDINE | 88 |
| 38 | 4-NITROACETOPHENONE | 60 | 15 | P-AMINOACETOPHENONE | 70 |
| 39 | 4-NITROBROMOBENZENE | 400 | 100 | 4-BROMOANILINE | 90 |
| 40 | 4-NITROPHENOL | 330 | 100 | P-AMINOPHENOL | 70 |
| 41 | α-NITROSTYRENE* | 330 | 55 | α-AMINOSTYRENE | 42 |

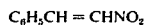*C$_6$H$_5$CH = CHNO$_2$

EXAMPLES 42 TO 45

HYDROGENATION OF NITROBENZENE DERIVATIVES USING HOMOGENEOUS CATALYSTS IN VARIOUS SOLVENTS

Using the apparatus, hydrogenation and isolation procedure of Example 13, and the tris (triphenylphosphine) ruthenium (II) chloride catalyst, nitrobenzene is hydrogenated at 120°C. under 1,200 psig hydrogen pressure, using a 200:1 molar ratio of nitrobenzene to catalyst. The experimental variable is the solvent system.

psig, and heated to 135°C. Hydrogen gas is then introduced into the reactor to a partial pressure of 1,200 psig, and reduction of the nitroxylenes is followed by gc analysis of samples withdrawn at regular periods. The results of the hydrogenation are summarized in Table VI. As can be seen, about 80 percent of the 4-nitro-o-xylene is preferentially hydrogenated to 3,4-xylidine before any significant hydrogenation of the 2-nitro-m-xylene isomer is observed. The experiment clearly indicates the unexpected selectivity of the ruthenium complex as a hydrogenating agent.

TABLE V

HYDROGENATION OF NITROBENZENE IN VARIOUS SOLVENTS

| EXAMPLE NO. | SOLVENT MEDIA | REACTION TIME (MIN.) | NITROBENZENE CONVERTED (%) | SELECTIVITY TO AMINE (%) |
|---|---|---|---|---|
| 42 | BENZENE/ETHANOL | 245 | 100 | 92 |
| 43 | BENZENE | 300 | 30 | 100 |
| 44 | BENZENE/ETHANOL/ACETIC ACID | 390 | 100 | 93 |
| 45 | METHYLENE CHLORIDE | 400 | >20 | 90 |

TABLE VI

SELECTIVE HYDROGENATION OF NITROXYLENE ISOMERIC MIXTURES

| TIME FOR START OF HYDROGENATION (MINS.) | % 4-NITRO-O-XYLENE CONVERTED TO 3,4-XYLIDINE | % 2-NITRO-M-XYLENE CONVERTED TO 2,6-XYLIDINE |
|---|---|---|
| 15 | 18 | 1 |
| 30 | 34 | 2 |
| 45 | 50 | 3 |
| 60 | 64 | 4 |
| 75 | 78 | 5 |
| 90 | 90 | 19 |
| 105 | 100 | 46 |
| 120 | 100 | 90 |
| 135 | 100 | 100 |

EXAMPLE 46B

SELECTIVE HYDROGENATION OF NITROAROMATIC MIXTURES USING A RUTHENIUM HOMOGENEOUS CATALYST

Using the apparatus, techniques and catalyst of example 46, nitrobenzene is preferentially hydrogenated to aniline at the exclusion of 2-nitromesitylene.

The charge comprises an equimolar mixture of nitrobenzene and 2-nitromesitylene (10 mmoles of each component), and 100 ml portion of an equimolar mixture of benzene and ethanol, and 0.38 g (0.40 mmoles) of $RuCl_2(P(C_6H_5)_3)_3$. That is, the molar ratio of the total nitroaromatics to catalyst in 50:1.

The results are summarized in Talbe VIB. As can be seen, about 95 percent of the nitrobenzene is preferentially hydrogenated before any significant reduction of the 2-nitromesitylene component to 2,4,6 trimethylaniline is observed.

The experiment again confirms the unexpected selectively of the ruthenium complex as a hydrogenating agent.

TABLE VIB

SELECTIVE HYDROGENATION OF NITROAROMATIC MIXTURES

| TIME FOR START OF HYDROGENATION (MINS.) | % NITROBENZENE CONV. TO ANILINE | % 2-NITROMESITYLENE CONV. TO 2,4,6-TRIMETHYLANILINE |
|---|---|---|
| 0 | 0 | 0 |
| 15 | 58 | <1 |
| 30 | 82 | <1 |
| 40 | 94 | 1 |
| 50 | <99 | 11 |
| 60 | 100 | 26 |
| 75 | 100 | 50 |
| 90 | 100 | 79 |
| 120 | 100 | 100 |

EXAMPLE 47

SELECTIVE HYDROGENATION OF p-DINITROBENZENE USING A RUTHENIUM HOMOGENEOUS CATALYST

Utilizing the apparatus, techniques and $RuCl_2[P(C_6H_5)_3]_3$ as the catalyst complex of Example 13, p-dinitrobenzene is selectively hydrogenated to p-nitroaniline prior to the formation of any p-phenylenediamine.

The charge solution, comprised of p-dinitrobenzene (4.20g., 25 mmole) and tris (triphenylphosphine) ruthenium (II) chloride (0.24 g., 0.25 mmole) dissolved in an equimolar, deoxygenated mixture of benzene, ethanol (80 ml) is heated to 105°C. under an initial 50 psig pressure of nitrogen. Hydrogen gas is then introduced into the reactor to a partial pressure of 1,200 psig, and reduction of the p-dinitrobenzene followed by gc analysis of samples withdrawn at regular periods.

The results of the hydrogenation are summarized in Table VII. Here it can be seen that more than 80 percent of the p-dinitrobenzene can be hydrogenated to p-nitroaniline before any significant quantity of the p-phenylenediamine is formed.

TABLE VII

| TIME FROM START OF HYDROGENATION (MINS.) | % p-DINITROBENZENE CONVERTED to p-NITROANILINE | % p-DINITROBENZENE CONVERTED to p-PHENYLENEDIAMINE |
|---|---|---|
| 30 | 20 | <1 |
| 60 | 35 | <1 |
| 90 | 47 | <1 |
| 120 | 56 | <1 |
| 180 | 70 | <1 |
| 240 | 78 | <1 |
| 300 | 84 | <1 |
| 360 | 87 | 4 |

EXAMPLES 48 to 50

HYDROGENATION OF OTHER POLYNITROAROMATICS USING A RUTHENIUM CATALYST

In these examples, the apparatus, hydrogenation technique and analytic methods referred to in the previous example 47 are used to hydrogenate the listed polynitroaromatics. Tris (triphenylphosphine) ruthenium (II) chloride is the catalyst employed, and the solvent is an equi-molar mixture of benzene and ethanol. The reactor temperature is 105°C. and the initial hydrogen pressure is 1,200 psig. The substrates and their major hydrogenated products are listed below. In some instances, the intermediate mixed nitro-amines may also be isolated in good yields.

| SUBSTRATE | MAJOR AMINE PRODUCT |
|---|---|
| m-DINITROBENZENE | m-PHENYLENEDIAMINE |
| 2,4-DINITROTOLUENE | 2,4-DIAMINOTOLUENE |
| 3,5-DINITRO-O-XYLENE | 3,5-DIAMINO-O-XYLENE |

EXAMPLES 51 TO 52

HYDROGENATION OF NITRATED DINUCLEAR AND POLYNUCLEAR AROMATICS USING A HOMOGENEOUS RUTHENIUM CATALYST

In these examples, the apparatus, hydrogenation techniques and analytical methods employed in Example 13 are used to hydrogenate the listed nitrated multinuclear rings. Tris (triphenylphosphine) ruthenium (II) chloride is the catalyst employed, and the solvent is an equi-molar mixture of benzene and iso-propanol. The reactor temperature is 135°C. and the initial hydrogen pressure is 1,300 psig. The substrates and their hydrogenated derivatives are listed below:

| SUBSTRATE | AMINE PRODUCT |
|---|---|
| 1-NITRONAPHTHALENE | 1-AMINONAPHTHALENE |
| 5-NITROANTHRACENE | 5-AMINOANTHRACENE |

In all instances, conversions are at least 50 percent and amine selectivity are at least 80 percent.

EXAMPLE 53

PREPARATION OF BENZYLAMINE FROM α-NITROTOLEUNE USING A HOMOGENEOUS RUTHENIUM CATALYST COMPLEX

Using the same apparatus, reduction procedure, and analytical techniques described in Example 13, 0.24g. (0.25 mmoles) of commercially obtained tris (triphenylphosphine) ruthenium (II) chloride, dissolved in 80 ml of a nitrogen-purged, equi-volume mixture of benzene and ethanol, is used to reduce 6.86 g. (50 mmoles) of α-nitrotoleune. The temperature employed in the sealed reactor is 135°C. and the reaction is run under 1,200 psig of hydrogen for 220 minutes. Upon cooling, isolation, separation and purification of the benzylamine product as described generally in Example 1, gc and ir confirm the identity of the amine.

EXAMPLE 54

DEUTERATION OF NITROBENZENE TO DEUTEROANILINE USING A RUTHENIUM HOMOGENEOUS CATALYST COMPLEX

Using the same apparatus, reduction procedure, and analytical techniques described in Example 13, 0.192g. (0.20 mmoles) of tris(triphenylphosphine)ruthenium-(II) chloride dissolved in 100 ml. of a nitrogen-purged, equivolume mix of benzene and ethanol, is used to reduce 4.10 ml of nitrobenzene (40 mmole). The temperature employed in the sealed reactor is 105°C. and the reaction is run for about 24 hours under 400 psig of deuterium.

After cooling, the amine product is isolated as described generally in Example 1; gc and ir confirm the identity of the product as a mixture of deuterated anilines (e.g. $C_6H_5ND_2$, $C_6H_5NHD$ and $C_6H_5NH_2$) with only a small percentage of deuterium exchange in the aromatic nucleus.

EXAMPLES 55 TO 66

HYDROGENATION OF NITROBENZENE USING OTHER IRON AND RUTHENIUM COMPLEXES AS CATALYST

Using the apparatus, hydrogenation technique and analytical methods described in Example 13, a number of iron and ruthenium complexes were employed as catalysts for the hydrogenation of the nitrobenzene substrate to aniline. The nitrobenzene and catalysts were solubilized in an equi-volume solvent mixture of benzene and ethanol. Experimental details, and a summary of the results are given in Table VIII.

It has been shown that various ruthenium and iron complexes containing these metals in the zero, 2 and 3 oxidation states, coordinated to carbonyl, nitrosyl, ketone and various alkyl and aryl phosphines and amine ligands are active catalysts for the subject hydrogenation.

TABLE VIII

HYDROGENATION OF NITROBENZENE USING OTHER IRON AND RUTHENIUM COMPLEXES AS CATALYST

| EXAMPLE NO. | CATALYST | NITROBENZENE/ CATALYST RATIO | REACTOR TEMP. (°C) | INITIAL $H_2$ PRESSURE (PSIG) | REACTION TIME (MINS) | NITROBENZENE CONVERSION (%) | ANILINE SELECTIVITY (%) |
|---|---|---|---|---|---|---|---|
| 55 | $Fe(CO)_3(PPh_3)_2$ | 200 | 120 | 1200 | 500 | 100 | 87 |
| 56 | $Fe(CO)_3(AsPh_3)_2$ | 200 | 120 | 1200 | 180 | 100 | 94 |
| 57 | $Fe(CO)_5$ | 200 | 120 | 1200 | 420 | 31 | >95 |
| 58 | $Fe(CH_3COCHCOCH_3)_3$ | 200 | 120 | 1200 | 330 | 100 | 97 |
| 59 | $Fe(NAPHTHANATE)_3$ | 200 | 120 | 1200 | 240 | 7 | >90 |
| 60 | $[RuCl_2(CO)_3]_2$ | 200 | 120 | 1200 | 220 | 100 | 85 |
| 61 | $RuCl_2(CO)_2(PPh_3)_2$ | 200 | 120 | 1200 | 300 | >95 | 94 |
| 62 | $RuCl_2(AsPh_3)_3$ | 200 | 120 | 1200 | 240 | >50 | 85 |
| 63 | $RuCl_2(As(C_2H_5)_3$ | 200 | 120 | 1200 | 240 | >10 | >70 |
| 64 | $RuHCl(PPh_3)_3$ | 200 | 120 | 1200 | 240 | 100 | 92 |
| 65 | $RuNOCl (PPh_3)_2$ | 200 | 120 | 1200 | 240 | >10 | >70 |
| 66 | $Ru(CH_3COCHCOCH_3)_3$ | 200 | 120 | 1200 | 240 | 24 | >95 |

EXAMPLES 67 TO 71

HYDROGENATION OF NITROBENZENE USING OTHER TRANSITION METAL COMPLEXES AS HOMOGENEOUS CATALYSTS

Using the apparatus, hydrogenation techniques and nitrobenzene substrate of Example 14, the below-listed homogeneous catalysts are employed to hydrogenate the substrate using molar ratios of substrate to catalyst of 10:1, a temperature of 135°C. and an initial hydrogen pressure of 1200 psig.

| EXAMPLE NO. | HOMOGENEOUS CATALYST |
|---|---|
| 67 | $Ni(CO)_2(PPh_3)_2$ |
| 68 | $Ni(CO)_2P(Ph_3)_2CH_2CH_2P(Ph_3)_2$ |
| 69 | $Co(CO)_8$ |
| 70 | $Co(CO)_3(P(n-Bu)_3)$ |
| 71 | $PdCl_2 (PPh_3)_2$ |

In all instances, gas chromatographic analysis indicates high selectivities, while conversions varied from fair to excellent.

As the numerous examples and the detailed disclosure of this invention indicate, the inventive process is both novel and advantageous in view of the known prior art. For example, most of the catalytic homogeneous catalysts as illustrated by $RuCl[P(C_6H_5)_3]_3$ can be carried out in anhydrous basic, neutral and in some instances acidic media. The high ratios of substrate to catalyst which may be employed minimize costs, and the hydrogenated products may be produced at consistently high conversions of nitroaromatics, as well as high selectivies to the desired corresponding amine.

In addition, quite unexpectedly the above catalyst can be used to:
a. selectively hydrogenate polynitroaromatic substrates to mixed amine-nitro intermediates,
b. to selectively hydrogenate certain alkylated nitrobenzene isomers in the presence of closely related structural isomers. For instance, 4-nitro-oxylene in equi-molar mixture of 4-nitro-o-xylene and 2-nitro-m-xylene can be selectively reduced to 3,4-xylidine without any significant conversion of the 2-nitroxylene,
c. to selectively hydrogenate substituted nitroaromatics to amines in the presence of other functional groups such as methoxy, halogen and acetyl.

Finally, the instant invention lends itself to various changes, substitutions and modifications without departing from the inventive concept. For instance, a variety of other iron and ruthenium complexes have been found to catalyze the hydrogenation of nitroaromatics to amines under given conditions, and furthermore other transition metals can be used as catalysts. Again, the media can vary from acidic to neutral through basic.

However, the metes and bounds of this invention can best be gleaned from an examination of the claims which follow, taken in conjunction with the preceding specification.

What is claimed is:

1. A process for reducing nitroaromatic substrates selected from the group consisting of nitrobenzene, o-nitrotoluene, m-nitrotoluene, p-nitrotoluene, 2-6-dimethyl-1-nitrobenzene, 2,5-dimethyl-1-nitrobenzene, 2,4-dimethyl-1-nitrobenzene, 3,5-dimethyl-1-nitrobenzene, 3,4-dimethyl-1-nitrobenzene, 2-nitromesitylene, 1-nitro-4-cyclohexylbenzene, 4-nitroaniline, 4-nitrochlorobenzene, 4-nitroanisole, 4-nitroacetophenone, 4-nitrobromobenzene, 4-nitrophenol, alphanitrostyrene, m-dinitrobenzene, 2,4-dinitrotoluene, 3,5-dinitro-o-xylene, 1-nitronaphthalene, and 5-nitroanthracene to their corresponding amines, utilizing a homogeneous ruthenium or iron catalyst selected from the group consisting of $RuCl_2[P(C_6H_5)_3]_3$, $RuCl_2[(CO)_3]_2$, $RuCl_2[As(C_6H_5)_3]_3$, $RuCl_2As(C_{As\ 2}H_5)_3]_3$, $RuHCl[P(C_6H_5)_3]_3$, $Ru(CH_3COCHCOCH_3)_3$, $RuCl(NO)[P(C_6H_5)_3]_2$, $Fe(CO)_3[P(C_6H_5)_3]_2$, $Fe(CO)_3[As(C_6H_5)_3]_2$, $Fe(CO)_5$, $Fe(CH_3COCHCOCH_3)_3$ and $[RuCl_2(CO)]_2[P(C_6H_5)_3]_2$ consisting essentially of:
  a. admixing each mole of said substrates to be reduced with from 0.005 to 0.02 molar portions of one of said catalysts in an oxidizer-free, non-aqueous solvent media until a homogeneous reaction mixture is formed,
  b. introducing hydrogen gas into said reaction mixture at superatmospheric pressures ranging from about 100 psig to about 2,000 psig, in amounts sufficient to reduce said nitro groups of said substrates to the amines, and
  c. heating said pressurized reaction mixture between about 35° to about 135° until said nitroaromatic substrates are reduced to said amines.

* * * * *

PO-1050
(5/69)

UNITED STATES PATENT OFFICE
CERTIFICATE OF CORRECTION

Patent No. 3,832,401        Dated August 27, 1974

Inventor(s) John F. Knifton and Robert M. Suggitt

It is certified that error appears in the above-identified patent and that said Letters Patent are hereby corrected as shown below:

Col.1,line 17: The "-" after "hydrogenated" should be deleted.
     line 23: "heretogeneous" should read --heterogeneous--
Col.2,line 34: The footnotes corresponding to "*" and "**" should appear at the end of the Column.
     lines 35-44: These lines, reading from "aniline using.." to "nitroaromatics" should be double spaced and put in larger type, as they are part of the patent.
Col.2,line 44: "*Lyons et al reference" should appear at the end of the column as a footnote.
Col.4,line 34: "singlephase" should read--single phase--
Col.3,lines 41 & 42: These lines should appear at the end of the Column as a footnote.
Col.7,line 17: "$RuCl_2$" should be the same size type as remainder of line.
Col.7,line 19: "*Where Ph is a symbol for the phenyl radical $C_6H_5$" should appear at the end of the Column as a footnote.
Col.7, end of line 19,line 20 & 21: From "RuCl onwards, these formula structures should be corrected to read as follows and should appear in larger print as part of the patent:

$$--RuCl_2[As(C_2H_5)_3]_3, \quad RuBr(PPh_3)_3,$$

$$Ru(CO)_3(PPh_3)_2, \quad RuCl_2[As(PPh_3)_3]_2,$$

$$Ru(Acet)_3. \quad *--$$

Col.7,lines 25-27: These lines should appear as footnotes at end of Column.

Col.7,line 57: "20°c" should read --20°C--

UNITED STATES PATENT OFFICE
CERTIFICATE OF CORRECTION

Page 2

Patent No. 3,832,401  Dated August 27, 1974

Inventor(s) John F. Knifton and Robert M. Suggitt

It is certified that error appears in the above-identified patent and that said Letters Patent are hereby corrected as shown below:

Col.8, line 57: "autoclave-cype" should read --autoclave-type--
Col.9, Table II "SUBSTRATE/-" should read --SUBSTRATE/ --
   (2nd Column)
Col.13, line 30: "and" should read --a--
Col.17, line 14: "selectivies" should read --selectivities--
Col.18, lines 19-25: The formula structures should be corrected to read as follows:

-- $RuCl_2[P(C_6H_5)_3]_3$, $[Ru(Cl_2(CO)_3]_2$, $RuCl_2[As(C_6H_5)_3]_3$, $RuCl_2[As(C_2H_5)_3]_3$, $RuHCl[P(C_6H_5)_3]_3$, $Ru(CH_3COCHOCH_3)_3$, $RuCl(NO)[P(C_6H_5)_3]_2$, $Fe(CO)_3[P(C_6H_5)_3]_2$, $Fe(CO)_3[As(C_6H_5)_3]_2$, $Fe(CO)_5$, $Fe(CH_3COCHOCH_3)_3$ and $RuCl_2(CO)_2[(C_6H_5)_3]_2$ --

Signed and sealed this 11th day of February 1975.

(SEAL)
Attest:

RUTH C. MASON
Attesting Officer

C. MARSHALL DANN
Commissioner of Patents
and Trademarks